US012574859B2

(12) United States Patent
Fakoorian et al.

(10) Patent No.: US 12,574,859 B2
(45) Date of Patent: Mar. 10, 2026

(54) SOUNDING REFERENCE SIGNAL TRIGGERING TECHNIQUES

(71) Applicant: QUALCOMM Incorporated, San Diego, CA (US)

(72) Inventors: Seyed Ali Akbar Fakoorian, San Diego, CA (US); Muhammad Sayed Khairy Abdelghaffar, San Jose, CA (US); Alexandros Manolakos, Escondido, CA (US); Runxin Wang, San Diego, CA (US); Yu Zhang, San Diego, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 590 days.

(21) Appl. No.: 18/001,693

(22) PCT Filed: Aug. 4, 2020

(86) PCT No.: PCT/CN2020/106755
§ 371 (c)(1),
(2) Date: Dec. 13, 2022

(87) PCT Pub. No.: WO2022/027217
PCT Pub. Date: Feb. 10, 2022

(65) Prior Publication Data
US 2023/0232339 A1 Jul. 20, 2023

(51) Int. Cl.
*H04W 52/32* (2009.01)

(52) U.S. Cl.
CPC .................................. *H04W 52/325* (2013.01)

(58) Field of Classification Search
CPC .......................... H04W 52/325; H04W 52/244
See application file for complete search history.

(56) References Cited

U.S. PATENT DOCUMENTS

2013/0156014 A1    6/2013   Kim et al.
2014/0219232 A1    8/2014   Takeda et al.
(Continued)

FOREIGN PATENT DOCUMENTS

CN          103379605 A    10/2013
CN          110049539 A    7/2019
(Continued)

OTHER PUBLICATIONS

International Search Report and Written Opinion—PCT/CN2020/106755—ISA/EPO—Apr. 25, 2021.
(Continued)

*Primary Examiner* — Ayodeji O Ayotunde
(74) *Attorney, Agent, or Firm* — QUALCOMM Incorporated

(57) ABSTRACT

Certain aspects of the present disclosure provide techniques for wireless communications by a user equipment (UE). The method generally includes receiving a downlink control information (DCI) with at least one block configured to trigger aperiodic sounding reference signal (SRS) transmission from the UE on at least one SRS resource set, determining a transmit power control (TPC) command to apply to the A-SRS if the DCI lacks a transmit power control (TPC) command for the at least one SRS set, and transmitting the A-SRS in accordance with the DCI and the determined TPC command.

26 Claims, 11 Drawing Sheets

900

(56) References Cited

U.S. PATENT DOCUMENTS

| | | | | |
|---|---|---|---|---|
| 2017/0264402 A1* | 9/2017 | Papasakellariou | ....... | H04B 7/04 |
| 2019/0075524 A1* | 3/2019 | Zhou | ................... | H04W 52/228 |

FOREIGN PATENT DOCUMENTS

| | | | |
|---|---|---|---|
| CN | 110710281 A | 1/2020 | |
| CN | 111447043 A | 7/2020 | |

OTHER PUBLICATIONS

Nokia, et al., "Maintenance for Additional SRS Symbols", 3GPP TSG RAN WG1 #100-e, R1-2000559, e-Meeting, Feb. 24, 2020-Mar. 6, 2020, 5 Pages, Feb. 6, 2020 (Feb. 6, 2020) sections 2, 3.

Ericsson: "On Additional SRS Symbols for DL Efficiency Enhancements", 3GPP TSG RAN WG1 Meeting #98, R1-1909375, 3rd Generation Partnership Project, Mobile Competence Centre, 650, Route Des Lucioles, F-06921 Sophia-Antipolis Cedex, France, vol. RAN WG1, No. Prague, CZ, Oct. 26, 2019-Oct. 30, 2019, Aug. 16, 2019, pp. 1-7, XP051765982, p. 2, p. 3-p. 4.

Huawei, et al., "Discussion on Power Control for Additional SRS", 3GPP TSG RAN WG1 Meeting #97, R1-1906068, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019, 3 Pages, XP051727525, Section 2.2, p. 2-p. 3.

Huawei, et al., "Discussion on Power Control for Additional SRS", 3GPP TSG RAN WG1 Meeting #97, R1-1906068, Reno, USA, May 13, 2019-May 17, 2019, May 4, 2019, 3 Pages.

Supplementary European Search Report—EP20948008—Search Authority—The Hague—Mar. 27, 2024.

\* cited by examiner

300

302

C-CU

5G C-plane

5G-GW

MR-CN

304

C-RU

MR-AN

5G AN

306

DU

DU

DU

500

505-a 505-b 505-c

| CU | | AN | | UE | |
|---|---|---|---|---|---|
| RRC 510 | | RRC 510 | | RRC 510 | |
| PDCP 515 | | PDCP 515 | | PDCP 515 | |

| DU | | | | | |
|---|---|---|---|---|---|
| RLC 520 | | RLC 520 | | RLC 520 | |
| MAC 525 | | MAC 525 | | MAC 525 | |
| PHY 530 | | PHY 530 | | PHY 530 | |

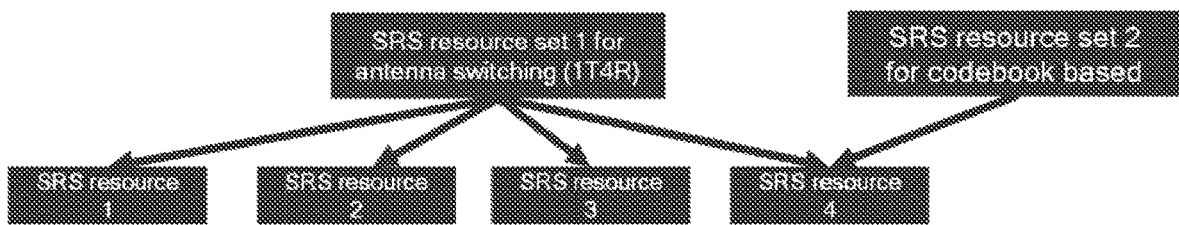

FIG. 7A

| Value of SRS request field | Triggered aperiodic SRS resource set(s) for DCI format 0_1, 1_0, and 2_3 configured with higher layer parameter *srs-TPC-PDCCH-Group* set to 'typeB' | Triggered aperiodic SRS resource set(s) for DCI format 2_3 configured with higher layer parameter *srs-TPC-PDCCH-Group* set to 'typeA' |
|---|---|---|
| 00 | No aperiodic SRS resource set triggered | No aperiodic SRS resource set triggered |
| 01 | SRS resource set(s) configured with higher layer parameter *aperiodicSRS-ResourceTrigger* set to 1 | SRS resource set(s) configured with higher layer parameter *SRS-SetUse* set to 'antenna switching' and *resourceType* in *SRS-ResourceSet* set to 'aperiodic' for a 1st set of serving cells configured by higher layers |
| 10 | SRS resource set(s) configured with higher layer parameter *aperiodicSRS-ResourceTrigger* set to 2 | SRS resource set(s) configured with higher layer parameter *SRS-SetUse* set to 'antenna switching' and *resourceType* in *SRS-ResourceSet* set to 'aperiodic' for a 2nd set of serving cells configured by higher layers |
| 11 | SRS resource set(s) configured with higher layer parameter *aperiodicSRS-ResourceTrigger* set to 3 | SRS resource set(s) configured with higher layer parameter *SRS-SetUse* set to 'antenna switching' and *resourceType* in *SRS-ResourceSet* set to 'aperiodic' for a 3rd set of serving cells configured by higher layers |

FIG. 7B

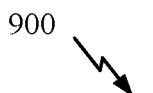

900

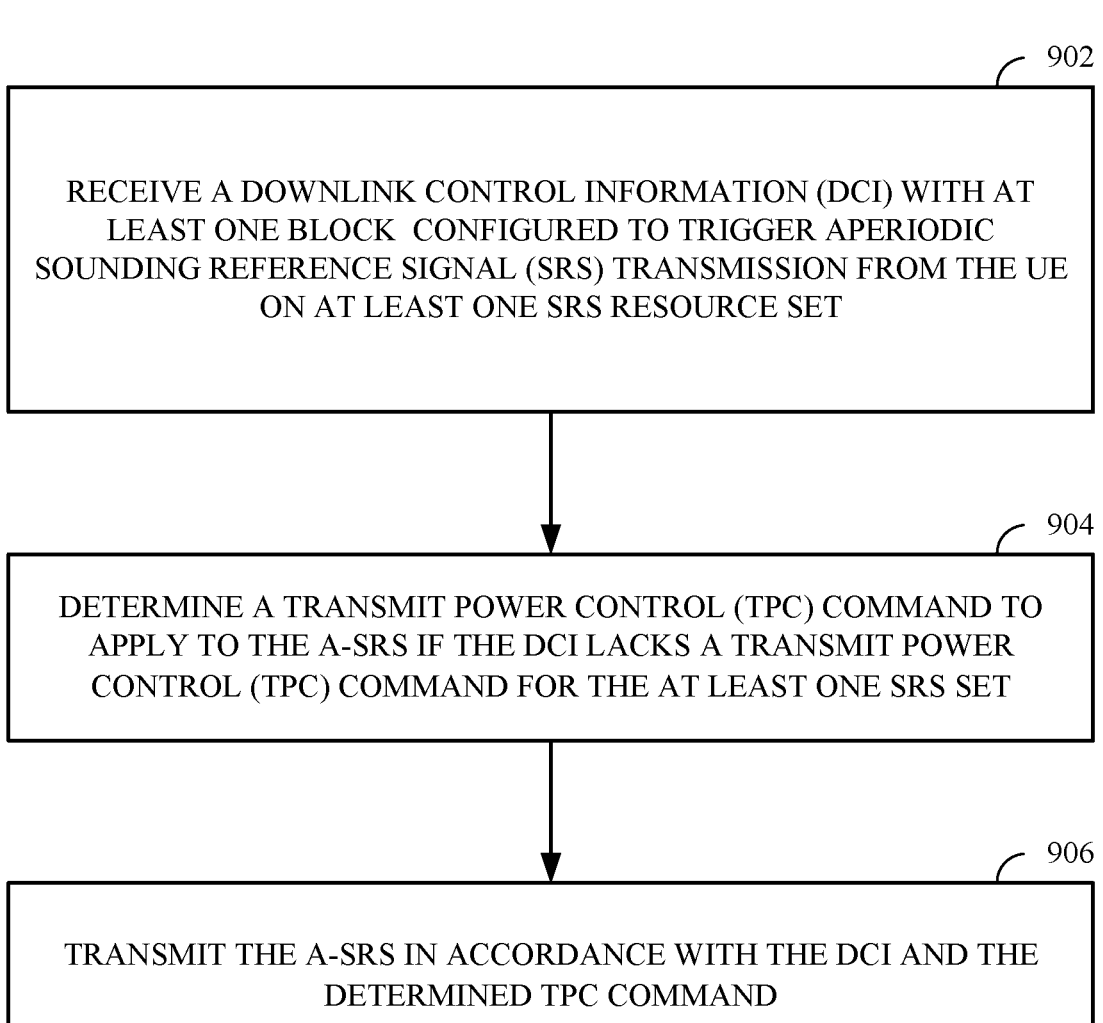

902

RECEIVE A DOWNLINK CONTROL INFORMATION (DCI) WITH AT LEAST ONE BLOCK  CONFIGURED TO TRIGGER APERIODIC SOUNDING REFERENCE SIGNAL (SRS) TRANSMISSION FROM THE UE ON AT LEAST ONE SRS RESOURCE SET

904

DETERMINE A TRANSMIT POWER CONTROL (TPC) COMMAND TO APPLY TO THE A-SRS IF THE DCI LACKS A TRANSMIT POWER CONTROL (TPC) COMMAND FOR THE AT LEAST ONE SRS SET

906

TRANSMIT THE A-SRS IN ACCORDANCE WITH THE DCI AND THE DETERMINED TPC COMMAND

FIG. 9

1000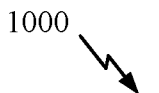

```
┌──────────────────────────────────────────────────────────────┐  1002
│                                                                │
│  TRANSMIT, TO AT LEAST ONE USER EQUIPMENT (UE), A DOWNLINK      │
│  CONTROL INFORMATION (DCI) WITH AT LEAST ONE BLOCK             │
│  CONFIGURED TO TRIGGER APERIODIC SOUNDING REFERENCE           │
│  SIGNAL (SRS) TRANSMISSION FROM THE UE ON AT LEAST ONE SRS     │
│  RESOURCE SET                                                  │
│                                                                │
└──────────────────────────────────────────────────────────────┘
```

```
┌──────────────────────────────────────────────────────────────┐  1004
│                                                                │
│  DECIDE WHETHER TO INCLUDE A TRANSMIT POWER CONTROL (TPC)       │
│  COMMAND IN THE DCI FOR THE AT LEAST ONE SRS RESOURCE SET       │
│  BASED ON ONE OR MORE CONDITIONS                               │
│                                                                │
└──────────────────────────────────────────────────────────────┘
```

```
┌──────────────────────────────────────────────────────────────┐  1006
│                                                                │
│  PROCESS A-SRS TRANSMITTED IN ACCORDANCE WITH THE DCI          │
│                                                                │
└──────────────────────────────────────────────────────────────┘
```

FIG. 10

SOUNDING REFERENCE SIGNAL TRIGGERING TECHNIQUES

CROSS-REFERENCE TO RELATED APPLICATION(S)

This application is a national stage application under 35 U.S.C. 371 of PCT/CN2020/106755, filed Aug. 4, 2020, which is hereby expressly incorporated by reference herein in its entirety as if fully set forth below and for all applicable purposes.

TECHNICAL FIELD

Aspects of the present disclosure relate to wireless communications, and more particularly, to techniques for triggering aperiodic sounding reference signal (SRS) via downlink control information (DCI).

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between UEs and a network.

Certain aspects provide a method for wireless communications by a user equipment (UE). The method generally includes receiving a downlink control information (DCI) with at least one block configured to trigger aperiodic sounding reference signal (SRS) transmission from the UE on at least one SRS resource set, determining a transmit power control (TPC) command to apply to the A-SRS if the DCI lacks a transmit power control (TPC) command for the at least one SRS set, and transmitting the A-SRS in accordance with the DCI and the determined TPC command.

Certain aspects provide a method for wireless communications by a network entity. The method generally includes transmitting, to at least one user equipment (UE), a downlink control information (DCI) with at least one block configured to trigger aperiodic sounding reference signal (SRS) transmission from the UE on at least one SRS resource set, deciding whether to include a transmit power control (TPC) command in the DCI for the at least one SRS resource set based on one or more conditions, and processing A-SRS transmitted in accordance with the DCI.

Certain aspects of the present disclosure also provide various apparatus, means, and computer readable medium configured to perform (or cause a processor to perform) the operations described herein. Indeed, aspects enable and provide enhanced downlink control information (e.g., DCI Format 2_3) configured to enable flexible SRS triggering for varying SRS usages. Deployment and usage scenarios are not limited to antenna switching instances and can be used during conditions where little to no antenna switching occurs. Further, aspects enable cross carrier or cross component carrier SRS triggering and simultaneous transmission (e.g., CC with PUSCH).

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 7A and 7B illustrate example SRS resource sets and DCI for triggering the same in accordance with some aspects.

FIG. 9 illustrates example operations by a UE, in accordance with aspects of the present disclosure.

FIG. 10 illustrates example operations by a network entity, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
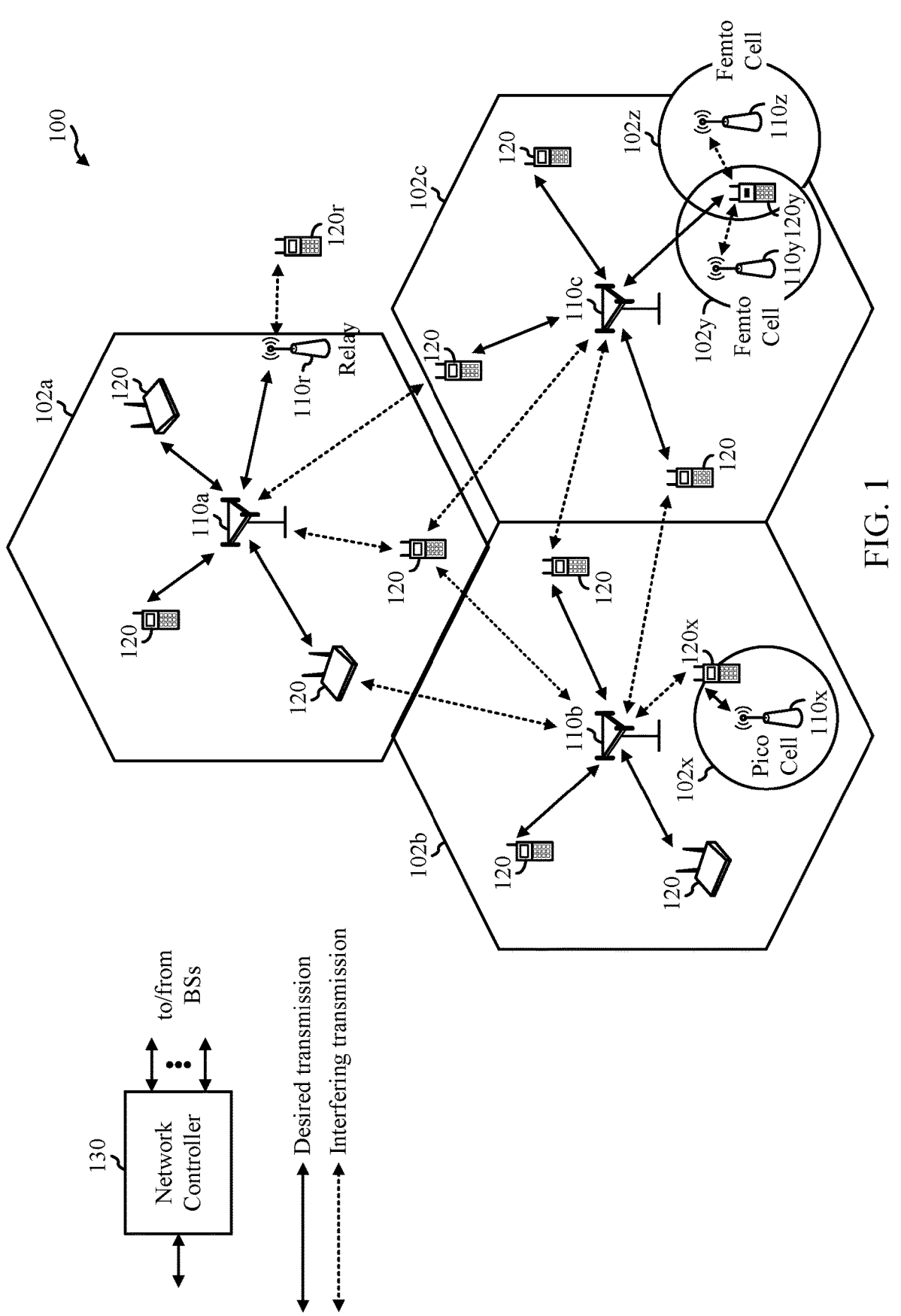
FIG. 1 is a block diagram conceptually illustrating an example telecommunications system, in accordance with certain aspects of the present disclosure.

Aspects of the present disclosure relate to wireless communications, and more particularly, to techniques for triggering A-SRS via one or more DCI formats. As will be describe in greater detail below, in some scenarios DCIs may lack power information (e.g., transmission power control (TPC) commands) and the UE may determine what TPC to apply based on other considerations.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, UEs 120 may be configured to perform operations 900 of FIG. 9 to send A-SRS triggered by DCI sent by a base station 110 performing operations 1000 of FIG. 10.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smartjewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
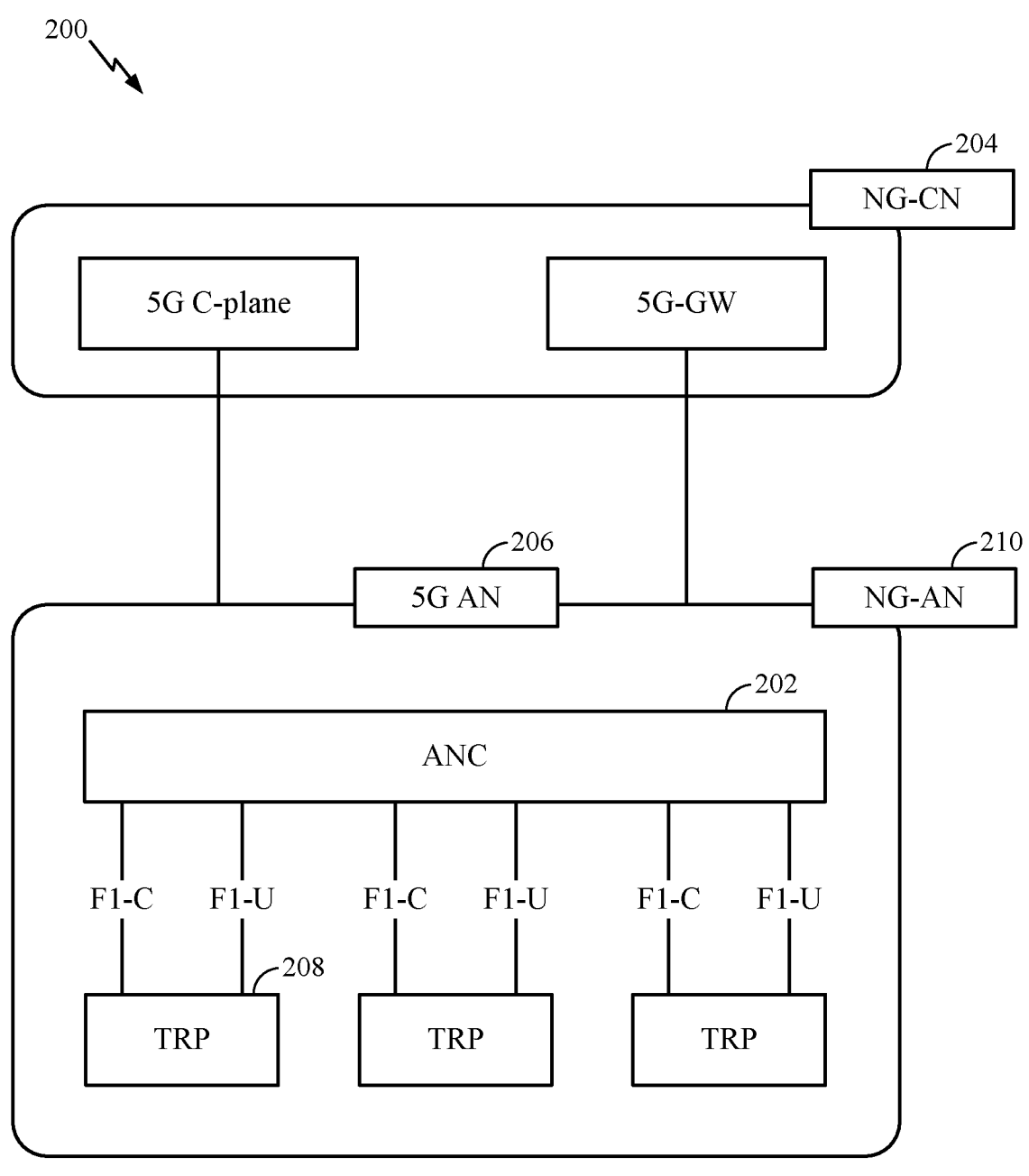
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
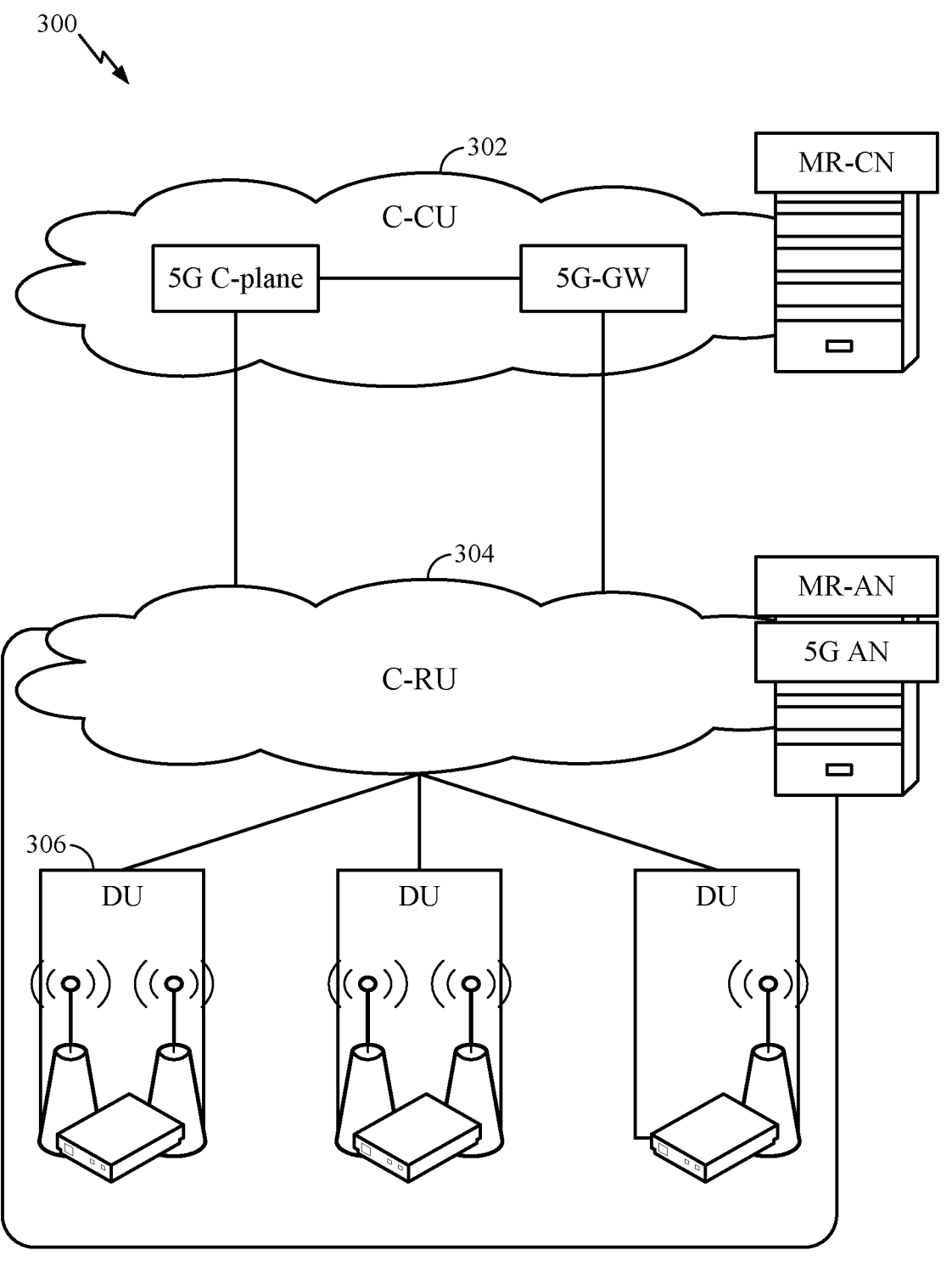
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
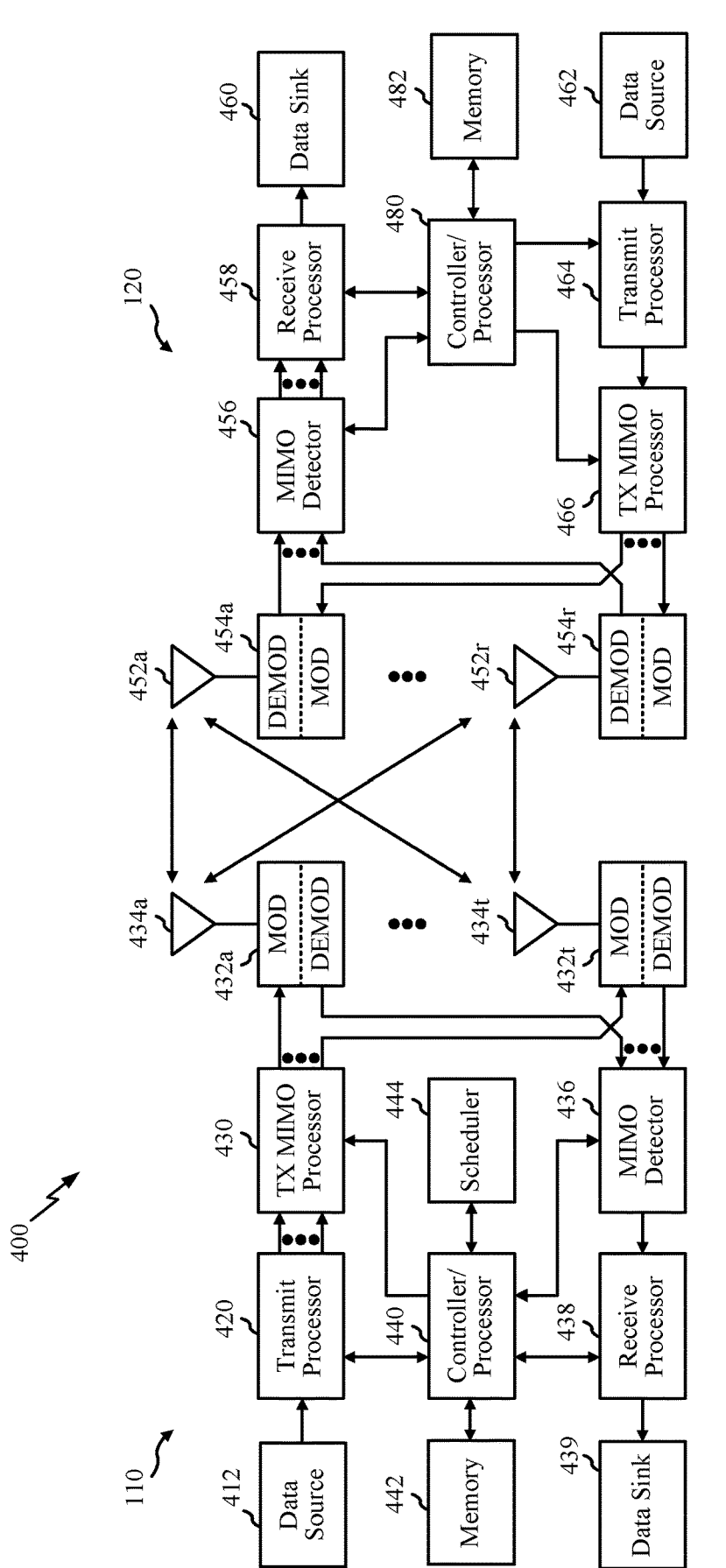
FIG. 4 is a block diagram conceptually illustrating a design of an example base station (B S) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may be used to perform operations 900 of FIG. 9. Similarly, antennas 434, processors 420, 430, 438, and/or controller/processor 440 of the UE 120 may be used to perform operations 1000 of FIG. 10.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) transmission from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

Figure 5:
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., a DU such as TRP DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
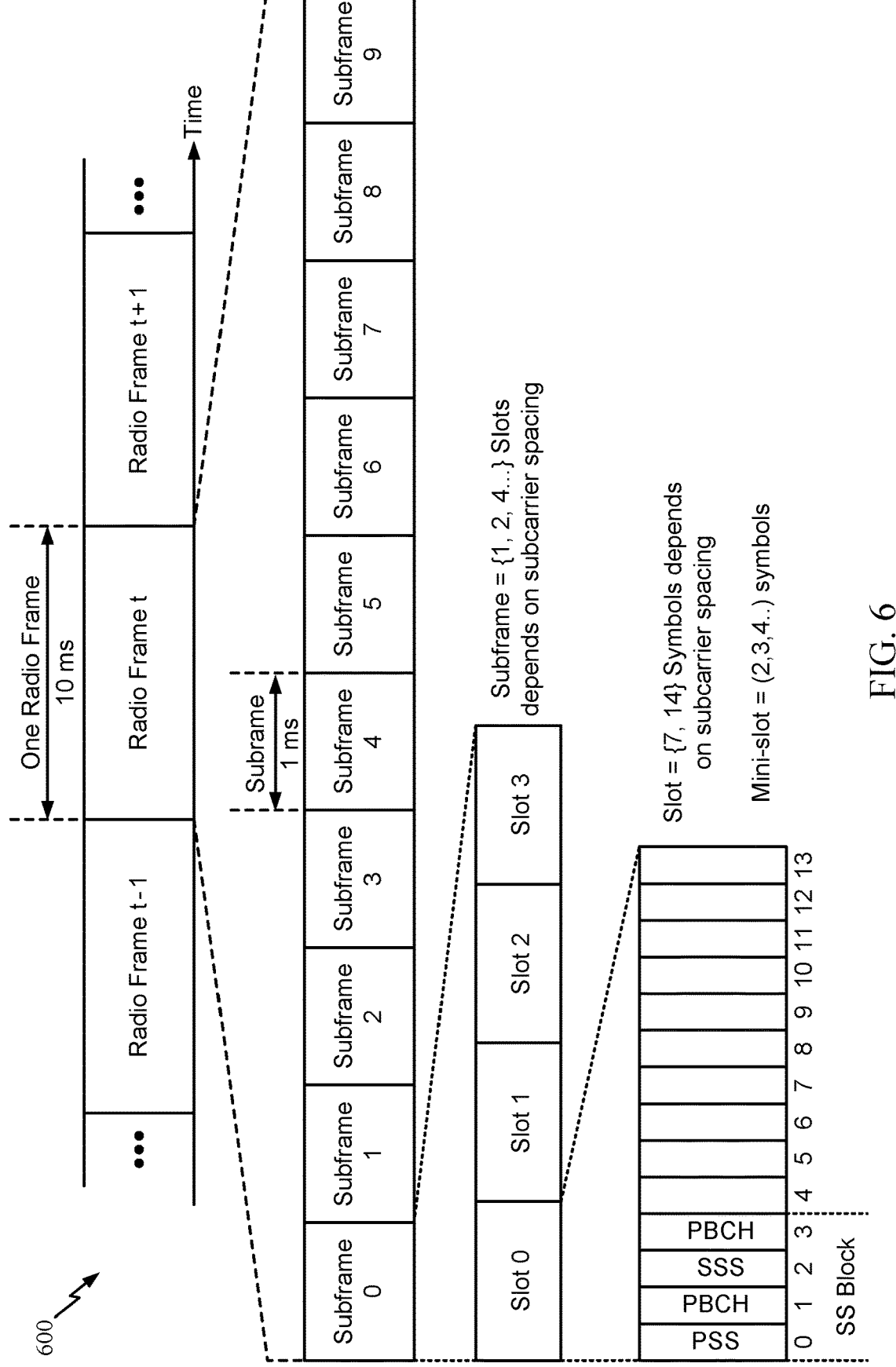
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example SRS Resource Configuration

SRS generally refers to a type of reference signal that may be used for channel quality determinations and/or other purposes. In some instances, UEs may transmit an SRS to and/or for a network entity (e.g., a base station such as a eNodeB/gNodeB) to determine the channel quality of uplink path for subsections (e.g., bandwidth parts or BWPs) of a frequency band. The network entity may use an SRS signal to determine a portion of system bandwidth to allocate (e.g., for a specific UE at a specific time). Wideband SRS transmissions may allow the network to determine which section across the overall bandwidth has better channel quality comparing to the other region. In this case, the network entity can allocate a specific frequency region best suited for each of the UEs.

As illustrated in FIG. 7A, a UE may be configured with one or more SRS resource sets. Each SRS resource set may be used for a particular purpose, such as antenna switching, beam management, or for codebook based transmissions. Each SRS resource set may have a corresponding identification and/or sets of SRS resources to be transmitted by one UE. As illustrated, multiple SRS resources may be grouped in an SRS resource set depending on the use case (e.g., whether the SRS is used for antenna switching, codebook-based, non-codebook based, and/or beam management).

SRS information may be transmitted in a variety of manners. For example, an SRS resource set may be transmitted aperiodically, semi-persistently, or periodically. For aperiodic transmission, a UE may be triggered to transmit an SRS resource set dynamically, for example, via a downlink control information (DCI). For periodic transmission, the UE may be configured to transmit an SRS resource set at a given periodicity (different SRS resource sets or SRS resources with an SRS resource set may be transmitted with different periodicities). For semi-persistent transmissions, the UE may be signaled to periodically transmit an SRS resource set for a duration (e.g., until signaled to stop).

As illustrated in FIG. 7B, for A-SRS transmission, bit information can be used for triggering SRS-related indications. As one particular, example, 2 bits in the DL or UL DCI can be used to trigger transmission of an SRS resource set. In some instances, each A-SRS resource set may be tagged with a numeric value of 1, or 2, or 3, corresponding to DCI codepoints 01, 10, or 11, while a DCI codepoint 00 indicates no A-SRS transmission.

SRS configurations may be provided in several manners. In some examples, each AP SRS resource set may be configured via radio resource control (RRC) signaling. In this manner, RRC signaling may include a slot offset (field slotOffset) which may indicate an integer value from 1 to 32. The slot offset indicates a number of slots between the triggering DCI and actual transmission of this SRS-ResourceSet. If the slot offset field is absent, the UE applies no offset (value 0). Once the SRS resource set is selected by DCI, the slot offset is fixed. Each SRS resource of a set also has an associated symbol index of the first symbol containing the SRS resource (startPosition). An SRS resource could span one or multiple consecutive OFDM symbols.

Example A-SRS Triggered by TPC-Less DCI

Aspects of the present disclosure relate to wireless communications, and more particularly, to techniques for triggering A-SRS via certain DCI formats, for example, that lack power command information (e.g., that lack TPC commands).

As noted above, A-SRS may be triggered by DCI of various formats. For example, a DCI format 2_3 may be used to switch a UE uplink transmission (UL Tx) from one serving cell to another. For example, such a DCI may switch the UE uplink transmission to a cell without UL PUSCH and PUCCH configured for transmitting A-SRS for a certain usage ('antennaSwitching').

DCI format 2_3 is typically used for the transmission of a group of TPC commands for SRS transmissions by one or more UEs. Along with a TPC command, an SRS request may also be transmitted. The content of the DCI format 2_3 arranged as multiple blocks: block1, block2, . . . blockB.

Figure 8A:
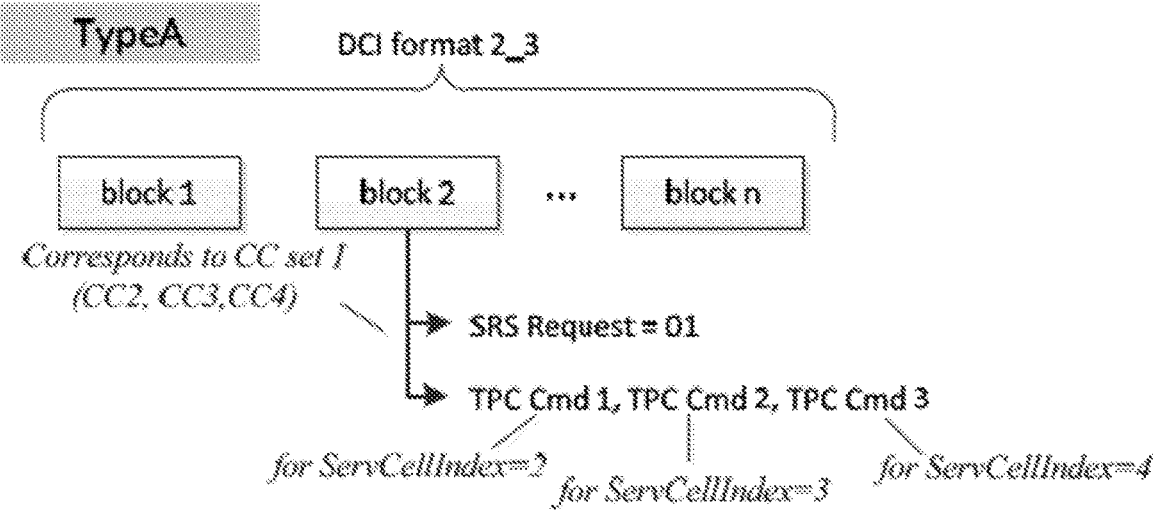
FIGS. 8A and 8B illustrate example DCI formats that may be used to trigger A-SRS in accordance with some aspects.
Figure 8B:
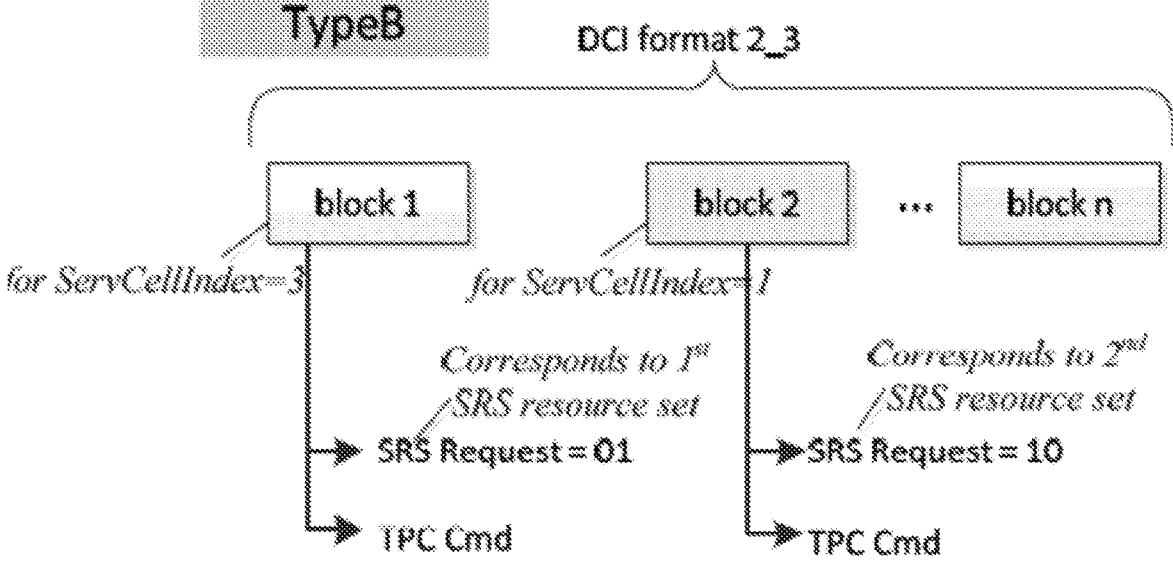

As illustrated in FIGS. 8A and 8B, there are two types of DCI format 2_3: Type-A and Type-B.

Via Type-A, the UE is configured with one block. This can apply to a component carrier (CC) set and contains an SRS request (e.g., 0, 2bits) to determine the CC set. N TPC commands may be provided, for each CC in the set.

Via Type-B, the UE is configured with one or more blocks. Each block applies to one UL carrier and contains an SRS request (0, 2bits) to determine the SRS resource set(s) and a TPC command (2 bit).

There are certain limitations to traditional use of DCI format 2_3. Such limitations include, for example, that SRS triggering is typically limited to only 'antennaSwitching' use SRS and only for CCs that are not configured with PUSCH ("PUSCH-less" CCs).

Aspects of the present disclosure provide and enable a new DCI (which may be considered an enhanced DCI format 2-3). This new DCI may enable flexible SRS triggering for different SRS usages, which is in contrast to conventional DCI format 2-3, which is limited to SRS triggering for 'AntennaSwitching' only. Ideally, such a DCI would enable cross carrier SRS triggering (e.g., where DCI sent on one CC triggers SRS on another CC) even on CCs configured with PUSCH. In some cases, a UL component carrier (CC) can be configured as PUSCH/PUCCH or PUSCH-less. This may help enable flexible cross CC SRS transmission (from UEs that support UL-CA), with relatively little or no switching time (e.g., the cross CC SRS transmission could occur in a subsequent slot that satisfies a slot offset for a corresponding SRS resource set).

Aspects of the present disclosure propose additional enhancements for groupcast DCI (GC-DCI) format designs for A-SRS triggering. For example, some formats may enable A-SRS triggering via DCI that lacks TPC commands (TPC-less SRS triggering).

FIG. 9 illustrates example operations 900 for wireless communications by a UE. For example, operations 900 may be performed by a UE 120 of FIG. 1 or FIG. 4 to transmit A-SRS triggered by a TPC-less DCI.

Operations 900 begin, at 902, by receiving a downlink control information (DCI) with at least one block configured to trigger aperiodic sounding reference signal (SRS) transmission from the UE on at least one SRS resource set. At 904, the UE determines a transmit power control (TPC) command to apply to the A-SRS if the DCI lacks a transmit power control (TPC) command for the at least one SRS set. At 906, the UE transmits the A-SRS in accordance with the DCI and the determined TPC command.

FIG. 10 illustrates example operations 1000 that may be considered complementary to operations 900 of FIG. 9. For example, operations 1000 may be performed by a BS 110 of FIG. 1 or 4 to send a TPC-less DCI to trigger A-SRS from a UE (performing operations 900 of FIG. 9).

Operations 1000 begin, at 1002, by transmitting, to at least one user equipment (UE), a downlink control information (DCI) with at least one block configured to trigger aperiodic sounding reference signal (SRS) transmission from the UE on at least one SRS resource set. At 1004, the network entity decides whether to include a transmit power control (TPC) command in the DCI for the at least one SRS resource set based on one or more conditions. At 1006, the network entity processes A-SRS transmitted in accordance with the DCI.

In some cases, the DCI may be a Type-B DCI with a configurable block length, allowing for a TPC-less block. For a CC with PUSCH, the power control for an SRS set(s) with usage 'Codebook' may follow the PUSCH power control. As such, there may be no need to indicate the TPC command if the triggered SRS resource set is for 'codebook' usage.

Thus, the DCI may have a Type-B block with only a 'SRS request' field, as the TPC command can be absent if the SRS request triggers 'Codebook' SRS resource sets for a CC with PUSCH. For PUSCH-less CC, on the other hand, the TPC command may be provided. For skipping the TPC command in some blocks, the block length may need to be re-configured (e.g., via RRC signaling) rather than a fixed block length.

There are various options for the usage type of SRS triggered by a TPC-less Type-B block. According to one option, the SRS request may trigger only SRS resource set(s) with 'codebook' usage. As noted above, in this case, there may be no need to include the TPC command in the block. As a result, the block length may be, for example, just 2 bits and the UE should read only 2 bits for the block.

According to another option, the SRS request filed may trigger SRS resource set(s) with mixed usages. For example, the SRS request field may trigger two SRS resource sets: one for 'codebook' and another one for 'antennaSwitching'. In such cases, the TPC command in the DCI may apply only to the non 'codebook' sets of that CC (i.e., 'antennaSwitching' for the example above). Transmit power for SRS for positioning (UL PRS) may be based on open loop power control. Therefore, the TPC command can also be absent in this case.

In some cases, for A UE configured with a 2_3 DCI Type-B without TPC command in the block, the UE may be implicitly indicated that the latest TPC command from serving cell is applicable to the CC. As a special case, the serving cell may also send that TPC before the DCI format 2_3 that triggers the A-SRS, for the specific purpose of indicated the TPC.

In some cases, the CC can be configured with PUSCH or can be PUSCH-less. For the PUSCH-less carrier aggregation (CA), the implicitly indicated TPC command may apply to an SRS with 'AntennaSwitching' usage. For the PUSCH CA, the implicitly indicated TPC command may apply to the triggered SRS set(s).

For intra-band CC, the path loss may be very similar for the CCs. This is why it may be possible for the CCs to share the same TPC command in some cases.

Figure 11:
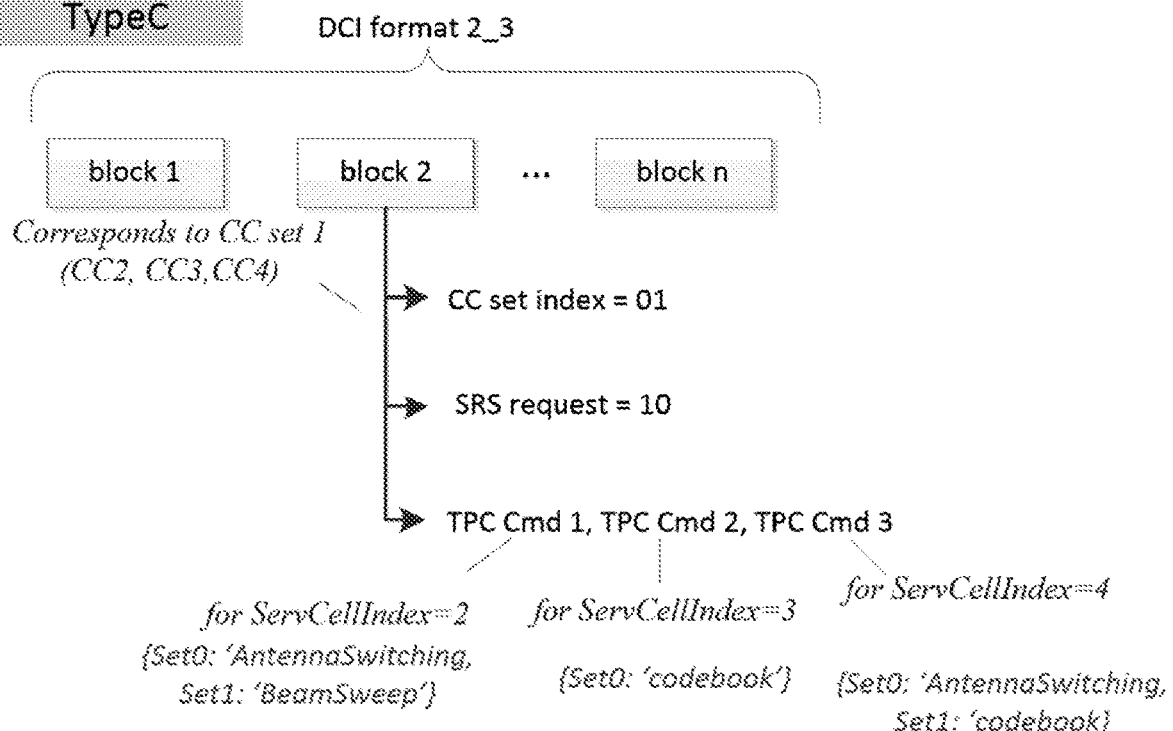
FIG. 11 illustrates example DCI formats that may be used to trigger A-SRS, in accordance with aspects of the present disclosure.

As illustrated in FIG. 11, in some cases, a new Type-C DCI format 2_3 may be used to trigger A-SRS with a TPC-less DCI. For the example shown in FIG. 11, there are various options for configurations of the TPC fields and corresponding UE behavior, if a CC has triggered SRS set(s) with 'codebook' usage.

For example, in one case, the SRS request may trigger only SRS resource set(s) with 'codebook' usage. In such cases, according to one option, a variable block size could be used to allow the TPC command to be absent for that CC. According to another option, a fixed block size could be used (and a dummy value for TPC could be used that the UE ignores).

In another case, the SRS request field may trigger SRS resource set(s) with mixed usages. In such cases, the TPC command may apply to non 'codebook' sets of that CC.

Aspects of the present disclosure provide a new type of DCI design that enables flexible SRS triggering for different SRS usages. The DCI design may enable cross-CC SRS triggering and simultaneous transmission (e.g., for CC with PUSCH configured).

Example Embodiments

Embodiment 1: A method for wireless communications by a user equipment (UE), comprising receiving a downlink control information (DCI) with at least one block configured to trigger aperiodic sounding reference signal (SRS) transmission from the UE on at least one SRS resource set, determining a transmit power control (TPC) command to apply to the A-SRS if the DCI lacks a TPC command for the at least one SRS set, and transmitting the A-SRS in accordance with the DCI and the determined TPC command.

Embodiment 2: The method of Embodiment 1, wherein the at least one block comprises an SRS request field configured to trigger SRS transmission on at least one SRS resource set for a component carrier (CC) configured for physical uplink shared channel (PUSCH) transmissions and the determining comprises determining to apply a TPC command received for a PUSCH transmission when transmitting the A-SRS.

Embodiment 3: The method of Embodiment 2, further comprising receiving radio resource control (RRC) signaling of a block length to reflect the lack of TPC command.

Embodiment 4: The method of any of Embodiments 1-2, wherein the SRS request field triggers an SRS resource set for codebook or positioning usage.

Embodiment 5: The method of Embodiment 4, wherein the at least one block has a variable block size depending on whether a TPC command is included; or the at least one block has a fixed block size regardless of whether a TPC command is included and, if a TPC command is not included, the block includes a value in a TPC command field that is ignored by the UE.

Embodiment 6: The method of any of Embodiments 1-5, wherein the SRS request field triggers one or more SRS resource sets with mixed usages.

Embodiment 7: The method of Embodiment 6, wherein the DCI lacks a TPC command for a first one of the SRS sets of a first usage; and the DCI includes a TPC command for a second one of the SRS sets of a second usage.

Embodiment 8: The method of Embodiment 7, wherein the first usage comprises codebook or positioning; and the second usage comprises antenna switching.

Embodiment 9: The method of any of Embodiments 1-8, wherein the at least one block comprises an SRS request field without a TPC command that triggers A-SRS on a component carrier (CC); and the determining comprises determining to apply a TPC command previously received from a serving cell when transmitting the A-SRS on the CC.

Embodiment 10: The method of Embodiment 9, further comprising receiving the TPC command specifically to apply to the A-SRS triggered by the DCI.

Embodiment 11: The method of any of Embodiments 1-10, wherein if the CC is not configured for physical uplink shared channel (PUSCH) transmissions, the previously received TPC command is applied to A-SRS transmitted on an SRS set for antenna switching usage; or if the CC is configured for PUSCH transmissions, the previously received TPC command is applied to A-SRS transmitted on one or more SRS sets triggered by the SRS.

Embodiment 12: A method for wireless communications by a network entity, comprising transmitting, to at least one user equipment (UE), a downlink control information (DCI) with at least one block configured to trigger aperiodic sounding reference signal (SRS) transmission from the UE on at least one SRS resource set, deciding whether to include a transmit power control (TPC) command in the DCI for the at least one SRS resource set based on one or more conditions, and processing A-SRS transmitted in accordance with the DCI.

Embodiment 13: The method of Embodiment 12, wherein the one or more conditions comprise that the at least one block comprises an SRS request field that triggers SRS transmission on at least one SRS resource set for a component carrier (CC) configured for physical uplink shared channel (PUSCH) transmissions and the UE applies a TPC command received for a PUSCH transmission when transmitting the A-SRS.

Embodiment 14: The method of Embodiment 13, further comprising transmitting radio resource control (RRC) signaling of a block length to reflect the lack of TPC command.

Embodiment 15: The method of any of Embodiments 13-14, wherein the one or more conditions further comprise that the SRS request field triggers an SRS resource set for codebook or positioning usage.

Embodiment 16: The method of Embodiment 15, wherein the at least one block has a variable block size depending on whether a TPC command is included; or the at least one block has a fixed block size regardless of whether a TPC command is included and, if a TPC command is not included, the block includes a value in a TPC command field that is ignored by the UE.

Embodiment 17: The method of any of Embodiments 12-16, wherein the SRS request field triggers one or more SRS resource sets with mixed usages.

Embodiment 18: The method of Embodiment 17, wherein the DCI lacks a TPC command for a first one of the SRS sets of a first usage; and the DCI includes a TPC command for a second one of the SRS sets of a second usage.

Embodiment 19: The method of Embodiment 18, wherein the first usage comprises codebook or positioning; and the second usage comprises antenna switching.

Embodiment 20: The method of any of Embodiments 12-19, wherein the at least one block comprises an SRS request field without a TPC command that triggers A-SRS on a component carrier (CC); and the UE applies a TPC command previously received from a serving cell when transmitting the A-SRS on the CC.

Embodiment 21: The method of Embodiment 20, further comprising transmitting the TPC command specifically to apply to the A-SRS triggered by the DCI.

Embodiment 22: The method of any of Embodiments 12-21, wherein if the CC is not configured for physical uplink shared channel (PUSCH) transmissions, the previously transmitted TPC command is to be applied to A-SRS transmitted on an SRS set for antenna switching usage; or if the CC is configured for PUSCH transmissions, the previously transmitted TPC command is to be applied to A-SRS transmitted on one or more SRS sets triggered by the SRS.

Embodiment 23: An apparatus for wireless communications by a user equipment (UE), comprising means for receiving a downlink control information (DCI) with at least one block configured to trigger aperiodic sounding reference signal (SRS) transmission from the UE on at least one SRS resource set, means for determining a transmit power control (TPC) command to apply to the A-SRS if the DCI lacks a TPC command for the at least one SRS set, and means for transmitting the A-SRS in accordance with the DCI and the determined TPC command.

Embodiment 24: An apparatus for wireless communications by a network entity, comprising means for transmitting, to at least one user equipment (UE), a downlink control information (DCI) with at least one block configured to trigger aperiodic sounding reference signal (SRS) transmission from the UE on at least one SRS resource set, means for deciding whether to include a transmit power control (TPC) command in the DCI for the at least one SRS resource set based on one or more conditions, and means for processing A-SRS transmitted in accordance with the DCI.

Embodiment 25: An apparatus for wireless communications by a user equipment (UE), comprising a receiver configured to receiving a downlink control information (DCI) with at least one block configured to trigger aperiodic sounding reference signal (SRS) transmission from the UE on at least one SRS resource set, at least one processor configured to determine a transmit power control (TPC) command to apply to the A-SRS if the DCI lacks a TPC command for the at least one SRS set, and a transmitter configured to transmit the A-SRS in accordance with the DCI and the determined TPC command.

Embodiment 26: An apparatus for wireless communications by a network entity, comprising a transmitter configured to transmit, to at least one user equipment (UE), a downlink control information (DCI) with at least one block configured to trigger aperiodic sounding reference signal (SRS) transmission from the UE on at least one SRS resource set and at least one processor configured to decide whether to include a transmit power control (TPC) command in the DCI for the at least one SRS resource set based on one or more conditions and to process A-SRS transmitted in accordance with the DCI.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, various operations shown in FIGS. 9 and 10 may be performed by various processors shown in FIG. 4. More particularly, operations 1000 of FIG. 10 may be performed by processors 420, 460, 438, and/or controller/processor 440 of the BS 110 shown in FIG. 4 while operations 900 of FIG. 9 may be performed by one or more of processors 466, 458, 464, and/or controller/processor 480 of the UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 9 and 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
  receiving a downlink control information (DCI) with at least one block configured to trigger aperiodic sounding reference signal (SRS) transmission from the UE on at least one SRS resource set;
  determining a transmit power control (TPC) command to apply to the A-SRS if the DCI lacks a TPC command for the at least one SRS set; and
  transmitting the A-SRS in accordance with the DCI and the determined TPC command.

2. The method of claim 1, wherein:
  the at least one block comprises an SRS request field configured to trigger SRS transmission on at least one SRS resource set for a component carrier (CC) configured for physical uplink shared channel (PUSCH) transmissions; and
  the determining comprises determining to apply a TPC command received for a PUSCH transmission when transmitting the A-SRS.

3. The method of claim 2, further comprising receiving radio resource control (RRC) signaling of a block length to reflect the lack of TPC command.

4. The method of claim 2, wherein the SRS request field triggers an SRS resource set for codebook or positioning usage.

5. The method of claim 4, wherein:
  the at least one block has a variable block size depending on whether a TPC command is included; or
  the at least one block has a fixed block size regardless of whether a TPC command is included and, if a TPC command is not included, the block includes a value in a TPC command field that is ignored by the UE.

6. The method of claim 2, wherein the SRS request field triggers one or more SRS resource sets with mixed usages.

7. The method of claim 6, wherein:
  the DCI lacks a TPC command for a first one of the SRS sets of a first usage; and
  the DCI includes a TPC command for a second one of the SRS sets of a second usage.

8. The method of claim 7, wherein:
  the first usage comprises codebook or positioning; and
  the second usage comprises antenna switching.

9. The method of claim 1, wherein:
  the at least one block comprises an SRS request field without a TPC command that triggers A-SRS on a component carrier (CC); and the determining comprises determining to apply a TPC command previously received from a serving cell when transmitting the A-SRS on the CC.

10. The method of claim 9, further comprising receiving the TPC command specifically to apply to the A-SRS triggered by the DCI.

11. The method of claim 9, wherein:

if the CC is not configured for physical uplink shared channel (PUSCH) transmissions, the previously received TPC command is applied to A-SRS transmitted on an SRS set for antenna switching usage; or if the CC is configured for PUSCH transmissions, the previously received TPC command is applied to A-SRS transmitted on one or more SRS sets triggered by the SRS.

12. A method for wireless communications by a network entity, comprising:

transmitting, to at least one user equipment (UE), a downlink control information (DCI) with at least one block configured to trigger aperiodic sounding reference signal (SRS) transmission from the UE on at least one SRS resource set;

deciding whether to include a transmit power control (TPC) command in the DCI for the at least one SRS resource set based on one or more conditions; and processing A-SRS transmitted in accordance with the DCI.

13. The method of claim 12, wherein:

the one or more conditions comprise that the at least one block comprises an SRS request field that triggers SRS transmission on at least one SRS resource set for a component carrier (CC) configured for physical uplink shared channel (PUSCH) transmissions; and the UE applies a TPC command received for a PUSCH transmission when transmitting the A-SRS.

14. The method of claim 13, further comprising transmitting radio resource control (RRC) signaling of a block length to reflect the lack of TPC command.

15. The method of claim 13, wherein the one or more conditions further comprise that the SRS request field triggers an SRS resource set for codebook or positioning usage.

16. The method of claim 15, wherein:

the at least one block has a variable block size depending on whether a TPC command is included; or the at least one block has a fixed block size regardless of whether a TPC command is included and, if a TPC command is not included, the block includes a value in a TPC command field that is ignored by the UE.

17. The method of claim 13, wherein the SRS request field triggers one or more SRS resource sets with mixed usages.

18. The method of claim 17, wherein:

the DCI lacks a TPC command for a first one of the SRS sets of a first usage; and the DCI includes a TPC command for a second one of the SRS sets of a second usage.

19. The method of claim 18, wherein:

the first usage comprises codebook or positioning; and the second usage comprises antenna switching.

20. The method of claim 12, wherein:

the at least one block comprises an SRS request field without a TPC command that triggers A-SRS on a component carrier (CC); and the UE applies a TPC command previously received from a serving cell when transmitting the A-SRS on the CC.

21. The method of claim 20, further comprising transmitting the TPC command specifically to apply to the A-SRS triggered by the DCI.

22. The method of claim 20, wherein:

if the CC is not configured for physical uplink shared channel (PUSCH) transmissions, the previously transmitted TPC command is to be applied to A-SRS transmitted on an SRS set for antenna switching usage; or if the CC is configured for PUSCH transmissions, the previously transmitted TPC command is to be applied to A-SRS transmitted on one or more SRS sets triggered by the SRS.

23. An apparatus for wireless communications by a user equipment (UE), comprising:

means for receiving a downlink control information (DCI) with at least one block configured to trigger aperiodic sounding reference signal (SRS) transmission from the UE on at least one SRS resource set;

means for determining a transmit power control (TPC) command to apply to the A-SRS if the DCI lacks a TPC command for the at least one SRS set; and means for transmitting the A-SRS in accordance with the DCI and the determined TPC command.

24. An apparatus for wireless communications by a network entity, comprising:

means for transmitting, to at least one user equipment (UE), a downlink control information (DCI) with at least one block configured to trigger aperiodic sounding reference signal (SRS) transmission from the UE on at least one SRS resource set;

means for deciding whether to include a transmit power control (TPC) command in the DCI for the at least one SRS resource set based on one or more conditions; and means for processing A-SRS transmitted in accordance with the DCI.

25. An apparatus for wireless communications by a user equipment (UE), comprising:

a receiver configured to receiving a downlink control information (DCI) with at least one block configured to trigger aperiodic sounding reference signal (SRS) transmission from the UE on at least one SRS resource set;

at least one processor configured to determine a transmit power control (TPC) command to apply to the A-SRS if the DCI lacks a TPC command for the at least one SRS set; and a transmitter configured to transmit the A-SRS in accordance with the DCI and the determined TPC command.

26. An apparatus for wireless communications by a network entity, comprising:

a transmitter configured to transmit, to at least one user equipment (UE), a downlink control information (DCI) with at least one block configured to trigger aperiodic sounding reference signal (SRS) transmission from the UE on at least one SRS resource set; and at least one processor configured to decide whether to include a transmit power control (TPC) command in the DCI for the at least one SRS resource set based on one or more conditions and to process A-SRS transmitted in accordance with the DCI.

* * * * *